(12) United States Patent
Schirripa

(10) Patent No.: US 6,282,520 B1
(45) Date of Patent: *Aug. 28, 2001

(54) COMPUTER SYSTEM AND METHODS FOR ALLOCATION OF THE RETURNS OF A PORTFOLIO AMONG A PLURALITY OF INVESTORS WITH DIFFERENT RISK TOLERANCE LEVELS AND ALLOCATION OF RETURNS FROM AN EFFICIENT PORTFOLIO

(75) Inventor: Felix Schirripa, Colts Neck, NJ (US)

(73) Assignee: Metropolitan Life Insurance Company, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/150,400

(22) Filed: Sep. 9, 1998

(51) Int. Cl.[7] ................................................. G06F 17/60
(52) U.S. Cl. ............................................................ 705/36
(58) Field of Search .................................................. 705/36

(56) References Cited

U.S. PATENT DOCUMENTS

| 4,566,066 | 1/1986 | Towers ................................. | 364/408 |
| 4,642,768 | 2/1987 | Roberts ................................ | 364/408 |
| 4,648,037 | 3/1987 | Valentino ............................. | 364/408 |
| 4,674,044 | 6/1987 | Kalmus et al. ...................... | 364/408 |
| 4,722,055 | 1/1988 | Roberts ................................ | 364/408 |
| 4,750,121 | 6/1988 | Halley et al. ........................ | 364/408 |
| 4,752,877 | 6/1988 | Roberts et al. ...................... | 364/408 |
| 4,774,663 | 9/1988 | Musmanno et al. ................. | 364/408 |
| 4,839,804 | 6/1989 | Roberts et al. ...................... | 364/408 |
| 4,933,842 | 6/1990 | Durbin et al. ....................... | 364/408 |
| 4,942,616 | 7/1990 | Linstroth et al. .................... | 381/51 |
| 4,953,085 | 8/1990 | Atkins ................................. | 364/408 |
| 4,969,094 | 11/1990 | Halley et al. ........................ | 364/408 |
| 5,101,353 | 3/1992 | Lupien et al. ....................... | 364/408 |
| 5,126,936 | 6/1992 | Champion et al. .................. | 364/408 |
| 5,148,365 | 9/1992 | Dembo ................................ | 364/402 |
| 5,193,056 | 3/1993 | Boes .................................... | 364/408 |
| 5,214,579 | 5/1993 | Wolfberg et al. ................... | 364/408 |
| 5,262,943 | 11/1993 | Earle ................................... | 364/408 |
| 5,291,398 | 3/1994 | Hagan ................................. | 364/408 |
| 5,414,838 | 5/1995 | Kolton et al. ....................... | 395/600 |

(List continued on next page.)

FOREIGN PATENT DOCUMENTS

| 3400-123 | of 1985 | (DE). |
| 53-76724 | 7/1978 | (JP). |
| 58-144965 | 8/1983 | (JP). |
| 59-153259 | 9/1984 | (JP). |
| 3-65785 | 3/1991 | (JP). |
| WO 95/06290 | 3/1994 | (WO). |

OTHER PUBLICATIONS

Gazis, D.C., "Real Estate Investment Analysis System," *IBM Technical Disclosure Bulletin*, vol. 13, No. 11, Apr. 1971 (pp. 3274–3275).

"Software at His Beck and Call, Manager's Bonds are Beautiful," *Wall Street Computer Review*, Jun. 1985 (pp. 9–12).

"Financial ES plans a complex future," AIWeek, Jun. 15, 1988.

Chapter 7—Optima Risky Portfolios of book titled "Investment" (pp. 192–233).

(List continued on next page.)

*Primary Examiner*—Tariq R. Hafiz
*Assistant Examiner*—Susanna Meinecke-Diaz
(74) *Attorney, Agent, or Firm*—Fulbright & Jaworski, LLP

(57) ABSTRACT

A method and system is presented for distributing returns from an investment portfolio to a plurality of investors with different risk tolerances as a function of the risk-return preferences of the investors. Said portfolio may correspond to a point on an efficient frontier related to the risk-return points selected by investors.

37 Claims, 7 Drawing Sheets

U.S. PATENT DOCUMENTS

| | | | |
|---|---|---|---|
| 5,631,828 | 5/1997 | Hagan | 395/204 |
| 5,644,727 | 7/1997 | Atkins | 395/240 |
| 5,673,402 | 9/1997 | Ryan et al. | 395/238 |
| 5,745,706 | 4/1998 | Wolfberg et al. | 395/235 |
| 5,752,236 | 5/1998 | Sexton et al. | 705/4 |
| 5,806,042 | 9/1998 | Kelly et al. | 705/4 |
| 5,819,230 | 10/1998 | Christie et al. | 705/4 |
| 5,852,811 | 12/1998 | Atkins | 705/36 |
| 5,864,828 | 1/1999 | Atkins | 705/36 |
| 5,875,437 | 2/1999 | Atkins | 705/40 |
| 5,878,405 | 3/1999 | Grant et al. | 705/39 |
| 5,884,285 | 3/1999 | Atkins | 705/36 |
| 5,911,135 | 6/1999 | Atkins | 705/36 |
| 5,911,136 | 6/1999 | Atkins | 705/36 |
| 5,926,792 | 7/1999 | Koppes et al. | 705/4 |
| 5,930,762 | 7/1999 | Masch | 705/7 |
| 5,991,744 | 11/1999 | DiCresce | 705/36 |
| 5,999,917 | 12/1999 | Facciani et al. | 705/36 |

OTHER PUBLICATIONS

Bodie et al., *Investments (3rd ed.)*. Irwin McGraw–Hill: Boston, 1996, (entire book).

Almgren, Robert and Neil Chriss, "Optimal Liquidation", pp. 1–37, Jan. 14, 1998.

Sivitanides, Petros, S., "Why Invest in Real Estate: An Asset Allocation Perspective", Real Estate Issues, vol. 22, No. 1, pp. 30–36, Apr. 1997.

Rabin, Bonnie R., "Total Compensation: A Risk/Return Approach", Benefits Quarterly, pp. 6–17, First Quarter 1995.

Michaud, Richard O., "The Markowitz Optimization Enigma: Is 'Optimized' Optimal?", Financial Analysts Journal, pp. 31–42, Jan.–Feb. 1989.

HR Magazine, V.38, N11, Nov. 1993, "Helping Employees Invest Wisely," K. Ranftle, et al., pp. 77–82.

Anonymous, "GICs in a new guise," Institutional Investor, V28, N1, p. 138 (1/94).

Watson, Ronald D., "Does targeted investing make sense?" Financial Management, V23, N4, pp. 69–74 (Wntr '94).

Mylnechuk, Larry H., "GIC Fugure Guided by Participant Desire for Stable Asset," Pension World, V28, N5, pp. 21–23 (5/92).

Sellon, Gordon, "Changes in Financial Intermediation: The role of Pension and Mutual Funds," Economic Review, V77, N3, pp. 53–70 (Fall '92).

Rom, B. and Ferguson, K.W., "Post–Modern Portfolio Theory Comes of Age," The Journal of Investing, pp. 11–17 (Fall '94).

Vladimir de Vassal, "Negative Returns Valuable in Risk Assessment," no date.

$$\mu_C = W_A\mu_A + W_B\mu_B$$

COMPUTER SYSTEM AND METHODS FOR ALLOCATION OF THE RETURNS OF A PORTFOLIO AMONG A PLURALITY OF INVESTORS WITH DIFFERENT RISK TOLERANCE LEVELS AND ALLOCATION OF RETURNS FROM AN EFFICIENT PORTFOLIO

FIELD OF THE INVENTION

The present invention relates to computer systems and methods for allocation of investments and distribution of investment returns based on a risk return analysis of modern portfolio theory.

BACKGROUND OF THE INVENTION

Individuals today may allocate their investment resources among a variety of asset classes; for example, equity, fixed income, international, emerging markets, etc. Within each asset class are a great number of individual assets to analyze and select. Investors may diversify and obtain professional management of their investment resources by investing in a professionally managed mutual fund. However, there are literally thousands of mutual funds to choose from offering a bewildering array of different investment philosophies. Many individuals do not have the time, inclination or expertise to manage their investments optimally or even choose the best mutual fund for their investment goals. Optimal investment of resources among a variety of assets is a complicated statistical and computationally intensive process beyond the reach of most investors.

Ideally an investor should allocate his or her investment to achieve a maximum expected rate of investment return consistent with the investor's tolerance for risk. A portfolio that is suitable for a particular investor can be constructed by combining assets with different expected rates of return and different levels of risk.

The expected rate of return for a combined portfolio of assets with different expected rates of return is the sum of the expected rates of return of each individual asset in the portfolio weighted by its proportion to the total portfolio:

$$\bar{r}_T = \sum_{i=1}^{N} \bar{r}_i w_i$$

where:
$\bar{r}_T$ is the expected rate of return of the portfolio of combined assets;
$\bar{r}_i$ is the expected rate of return of the $i^{th}$ asset;
$w_i$ is the proportion of the value of the $i^{th}$ asset to the total portfolio value, $$\left(\sum_{i=1}^{N} w_i = 1\right) \text{ and}$$

N is the total number of assets in the portfolio.

For example, consider a stock, A, with an expected rate of return $\bar{r}_1=0.1$ and a bond, B, with an expected rate of return $\bar{r}=0.05$. The expected rate of return of a portfolio consisting of 40% stock A and 60% bond B will be:

$\bar{r}_T = 0.1 \times 0.4 + 0.05 \times 0.6 = 0.07$

Risk may be characterized in different ways. Probably the most common measure of risk is volatility, measured by standard deviation. Standard deviation is the square root of the variance of the returns of an asset or portfolio of assets. The variance is a measure of the extent to which the return on an asset or portfolio of assets deviates from an expected return. An asset with a higher standard deviation will be considered more risky than an asset with a lower standard deviation. Other measures of risk include semi-variance about a target return, which is a measure of the extent to which the return of an asset or portfolio of assets will fall below a target level of return. Another measure of risk is "value at risk," which is a measure of how much an asset or portfolio of assets can lose in value with a given probability.

The risk level of a combined portfolio of assets will depend on the risk measure used. For example, consider the risk associated with a combined portfolio using variance, or equivalently, standard deviation as the measure of risk. The standard deviation of the returns of a risk-free asset is zero whereas the standard deviation of the returns of a risky asset is greater than zero. Standard deviation is the square root of the variance. The variance is:

$E\{(r-\bar{r})^2\}$ where:
r is a random variable representing the rate of return on an asset or portfolio;
$\bar{r}$ is the expected value of r; and
E denotes the expectation operator.

Combining a plurality of risky and risk-free assets in a portfolio will result in a portfolio with a standard deviation that is equal to or less than the weighted sum of the standard deviations of the component assets. For example, when two risky assets with variances $\sigma_1^2$ and $\sigma_2^2$, respectively, are combined into a portfolio with portfolio weights $w_1$, and $w_2$, respectively, the portfolio variance, $\sigma_T^2$, is given by:

$$\sigma_T^2 = w_1^2 \sigma_1^2 + w_2^2 \sigma_2^2 + 2 w_1 w_2 \text{cov}(r_1, r_2)$$

where cov $(r_1, r_2)$ =the covariance of the two assets.

The covariance is a measure of how much the returns on the two assets move in tandem, and is defined as follows:

cov $(r_1,R_2)=\sigma_{12}=E[(r_1-\bar{r}_1)(r_2-\bar{r}_2)]$

A positive covariance means that the asset returns move together; if one has a positive deviation from its mean, they both do. A negative covariance means that asset returns move in opposite directions; if one has a positive deviation from its mean, the other has a negative deviation from its mean. The correlation coefficient, $\rho_{12}$, is the covariance of the two assets divided by the product of their standard deviations (i.e., $\rho_{12}=\sigma_{12}/(\sigma_1\sigma_2)$). The correlation coefficient, $\rho_{12}$ may range from −1 (indicating perfect negative correlation) and +1 (indicating perfect positive correlation). Thus, the magnitude of the correlation coefficient, $|\rho_{12}|$, is always less than or equal to 1.

The equation for the variance of the portfolio, $\sigma_T^2$, shows that a positive covariance increases portfolio variance beyond $\Sigma w_i^2 \sigma_i^2$. A negative covariance decreases portfolio variance. By investing in two assets that are negatively correlated, if one asset has a return greater than its expected return, that positive deviation should be offset by the extent to which the return of the other asset falls below its expected return.

The equation for $\sigma_T$ further shows that the standard deviation of the portfolio is always equal to (in the case $\rho_{12}=1$) or less than (in the case $|\rho_{12}|<1$) the weighted sum of the standard deviations of the component assets. That is:

$$\sigma_T \leq w_1\sigma_1 + w_2\sigma_2$$

Since the return of the combined portfolio is the weighted average of the returns of the component assets, portfolios of less-than-perfectly correlated assets always offer better risk return opportunities than the individual component securities. See, e.g., "Investments, 3rd Edition," p. 197, Bodie, Kane & Marcus, Irwin, McGraw Hill (1996). These results are true generally for a combined portfolio comprising numerous risky assets, for which the variance is given by:

$$\sigma_T^2 = \sum_{i=1}^{N} w_i^2 \sigma_i^2 + \sum_{\substack{i=1 \\ i \neq j}}^{N} \sum_{j=1}^{N} w_i w_j \operatorname{cov}(r_i, r_j)$$

Thus, since the magnitude of the correlation coefficient, $|\rho_{12}|$, for any two different assets, $(a_i, a_j)$, is less than or equal to 1, $\sigma_T^2$ is always less than or equal to $$\left(\sum_{i=1}^{N} w_i \sigma_i\right)^2.$$

Thus, $\sigma_T$ is always less than or equal to $$\sum_{i=1}^{N} w_i \sigma_i$$

Given a set of imperfectly correlated risky assets, an innumerable set of combined portfolios can be constructed, each comprising different proportions of the component assets. An optimum portfolio is one in which the proportion of each asset comprising the portfolio results in the highest expected return for the combined portfolio for a given level of risk. Alternatively, an optimum portfolio is one in which the proportion of each asset comprising the portfolio minimizes the risk of the combined portfolio for any targeted expected return. See, e.g., "Investments, 3rd Edition," Bodie, Kane & Marcus, Irwin, McGraw Hill (1996).

This is illustrated in FIG. 1, using variance, or equivalently, standard deviation, as the risk measure. FIG. 1 is a graph of the minimum variance frontier of risky assets. This frontier is a graph of the expected risk and return of the portfolios with the lowest possible risk for given expected returns. This graph can be obtained by finding the set of weights for each component asset that will give the minimum variance for each targeted expected return.

The global minimum variance, Point A in FIG. 1, is the lowest variance that can be achieved, given the assets selected to comprise the portfolio. The portion of the minimum variance frontier that is concave downward, lying above and to the right of the global minimum variance, is called the efficient frontier. In FIG. 1, the efficient frontier is represented by the solid line above and to the right of Point A. The portion of the curve that is concave up from the global minimum variance represents inefficient points (portfolios), as there are points that lie directly above with higher expected return at the same level of risk (those points on the efficient frontier). In FIG. 1, these points are represented by the dashed line below and to the right of Point A.

In FIG. 2, the shaded area represents where the efficient frontier will always lie. Points A and B in FIG. 2 represent two portfolios on the efficient frontier. If the portfolios represented by Points A and B are perfectly positively correlated ($\rho=1$), the efficient frontier curve is the solid line connecting Points A and B. This line is the weighted average of any combination of the two portfolios. If the portfolios represented by Points A and B are perfectly negatively correlated ($\rho-1$), the efficient frontier curve is the dashed lines connecting Points A and B. This line shows that a certain combined portfolio of A and B will have a risk level equal to zero. For any portfolios A and B which are not perfectly correlated ($-1<\rho<1$), the efficient frontier curve must lie in the shaded area of FIG. 2, which is bordered by the perfectly positive and negative correlation lines. To lie in this shaded area between any two points on the efficient frontier, it must have the concave downward shape.

The efficient frontier is the curve that yields the highest expected return for a given level of risk. All other combinations of the assets selected to comprise the portfolio will result in a lower expected return for a given risk level. In particular, the risk-return plot of each individual asset will lie below and to the right of the efficient frontier. The efficient frontier represents the optimum risk-return opportunities available to an investor from a portfolio of risky assets.

Although variance is the measure of risk used to depict the efficient frontier in FIG. 1, an efficient frontier may be determined in terms of other risk measures as well. (See for example, "Post-Modern Portfolio Theory Comes of Age," B. Rom and K. Ferguson, *The Journal of Investing*, Fall 1994).

Ideally, a rational investor would choose to invest in a portfolio corresponding to the point on the efficient frontier that yields the highest expected return consistent with the investor's tolerance for risk. An investor who is highly risk averse should choose a point on the efficient frontier that provides a lower risk than an investor who is less risk averse. Consequently, the investor that is more highly risk averse will attain a lower expected return than would be attained by the less risk averse investor. Nevertheless, by choosing a portfolio that lies on the efficient frontier, each investor will attain the highest expected return attainable for a given level of risk. In practice, however, most investors lack the time, knowledge or inclination to perform the calculations required to construct a portfolio on an efficient frontier.

Many investment products available today offer the investor various risk-return choices. For example, an investor may choose among a finite set of portfolios, each comprising a different preselected mix of assets corresponding to a different risk preference. These products provide separate portfolios for each of a set of different risk preferences that may not lie on the efficient frontier. Similarly, investment products which allow an investor to select his or her own mix of various assets or portfolios will generally not result in a portfolio that lies on the efficient frontier. In short, investment products currently available to investors are suboptimal. They fail to provide the investor with the highest attainable expected return for a given level of risk. Also, current products do not pool investors with different risk tolerances to take advantage of diversification.

Therefore, what is needed is a system and method for allocating the returns from a single portfolio to a plurality of investors with different risk tolerances as a function of the preferred risk-return combinations chosen by the investors. Also, what is needed is a system that will provide to each investor risk-return opportunities that lie on or above an efficient frontier so that each investor will attain the highest achievable expected return for a given level of risk and the potential to earn more than the investor could have earned if the investor invested in an efficient portfolio on his or her own.

SUMMARY OF THE INVENTION

An object of the present invention is therefore to provide a system and methods for providing to participating investors risk-return opportunities that lie on or above an efficient frontier. Another object of the present invention is to provide a system and methods for allocating the returns from a single portfolio to a plurality of investors with different risk tolerance levels as a function of the risk-return preferences chosen by the investors.

The present invention provides a method for distributing returns from an investment portfolio to a plurality of participants with different risk tolerances by allocating a portion of the portfolio return to each participant on the basis of a risk-return preference selected by the participant. The risk-return combination to be selected by each participant may be one of a plurality of points offered to the participants, each point corresponding to a different investment objective such as conservative, moderate, aggressive, etc. The present invention also provides a method for distributing returns from a portfolio lying on an efficient frontier, comprising the steps of determining a portfolio corresponding to a point on an efficient frontier and distributing returns from said portfolio among said participants. The point on the efficient frontier to which the portfolio corresponds is associated with risk-return points on the efficient frontier selected by the participants. The point on the efficient frontier to which the portfolio corresponds may be selected to correspond to a level of risk associated with risk levels selected by each participant. In particular, the point may be selected to correspond to a risk level equal to a weighted average of risk levels selected by each participant, where the weighting is based on the participant's share of the total value of the portfolio. Alternatively, the point on the efficient frontier to which the portfolio corresponds may be selected to correspond to an expected return associated with expected returns selected by the participants. In particular, the point may be selected to correspond to an expected return equal to a weighted average of the expected returns selected by each investor.

The returns from the portfolio are distributed to the participants according to a predetermined allocation function. The allocation function will allocate earnings based on each participant's selected risk level and expected return.

The present invention provides a system for distributing returns from an investment portfolio among a plurality of participants with different risk tolerances comprising: memory for storage of data representative of risk-return points selected by each of said participants; and a processor for: (a) determining the returns of the portfolio; and (b) determining a distribution of the returns to each participant as a function of the risk-return points selected by the participants.

The present invention also provides a system for distributing returns from an investment portfolio lying on an efficient frontier among a plurality of participants with different risk tolerances comprising: (a) memory storage for storing (i) data representative of investment risk and expected returns associated with assets in a group of selected assets; (ii) and data representative of risk-return points selected by each of said participants; and (b) a processor for (i) determining an efficient frontier from said data representative of said investment risk and said expected returns associated with said assets, (ii) determining a portfolio corresponding to a point on said efficient frontier, (ii) determining returns from said portfolio, and (iv) determining a distribution of said returns to each of said participants.

According to one aspect of the invention, a portfolio manager determines a portfolio of assets to be invested in by each of a plurality of participants, each with a different risk-return preference. Preferably this portfolio will lie on an efficient frontier of risk-return opportunities and each participant would select their chosen risk-return preference point on the efficient frontier based on such factors as his or her risk tolerance, investment time horizon and financial situation. The portfolio manager would construct a portfolio that lies on the point of the efficient frontier that corresponds to the level of risk equal to the weighted average of risks levels chosen by each participant. The expected return of the portfolio so constructed will be greater than the weighted average of expected returns chosen by the participants. Alternatively, the portfolio manager could construct a portfolio that lies on the point of the efficient frontier corresponding to an expected return equal to the weighted average of the expected returns selected by the participants. The risk associated with a portfolio so constructed will be less than the weighted average of risk levels selected by the participants. The portfolio could also be constructed to be at other points on the efficient frontier.

The actual return of the efficient portfolio may be allocated to each participant based on the risk-return point selected by the participant. The present invention may allocate to each participant an optimal return for his or her investment given the participant s selected risk level and expected return.

The present invention incorporates various measures of risk including standard deviation, semi-variance about a target return and value at risk. The present invention further encompasses different allocation methods for optimally distributing the actual return of the efficient portfolio among participants.

The principles of the present invention maybe applied to any financial product that includes an investment component including mutual finds, variable annuities, variable universal life, 401(k) plans, etc. Another aspect of the present invention is the capability of providing guarantees with respect to the returns allocated to each participant. For example, a minimum rate of return each year or over a period of years can be provided. The guarantee could also be based on the return of other assets or an index such as the S&P 500. Further, these guarantees can vary according to selected risk levels and could be optional.

These and additional features and advantages of the present invention will become further apparent and better understood with reference to the following detailed description and attached drawings.

DETAILED DESCRIPTION OF THE PREFERRED EMBODIMENTS

Figure 4:
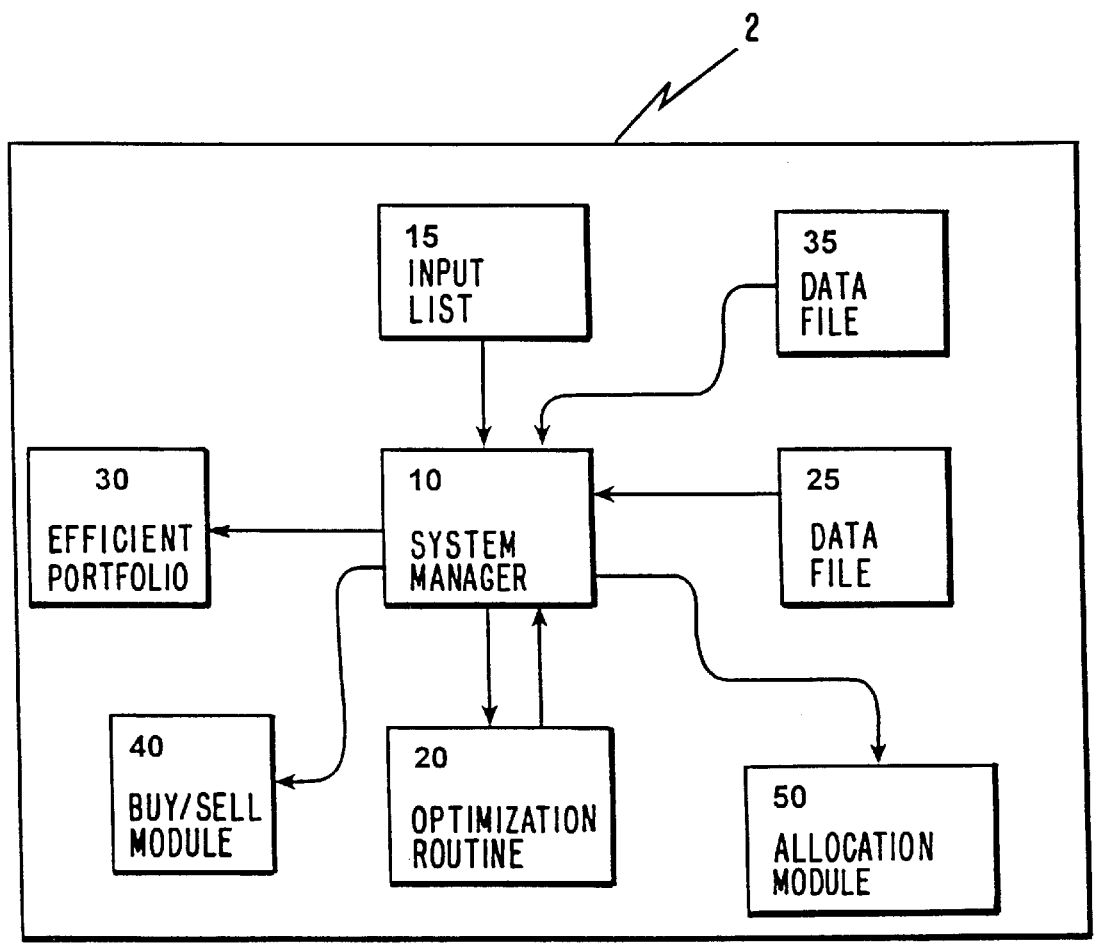
FIG. 4 is a functional block diagram of an embodiment of the present invention.

A diagram of a preferred embodiment of the present invention is shown in FIG. 4 as system 2. The functions of system 2 may be implemented in special purpose hardware or in a general or special purpose computer operating under the directions of software, and in conjunction with memory storage and input/output devices. In a preferred embodiment the functions of system 2 are controlled by software instructions which direct a computer or other data processing apparatus to receive inputs, perform computations, transmit data internally, transmit outputs and effectuate the receipt and transfer of funds as described herein.

The present invention provides a system for distributing returns from an investment portfolio among a plurality of participants with different risk tolerances comprising: memory for storage of data representative of risk-return points selected by each of the participants; and a processor for (a) determining the returns of the portfolio and (b) determining a distribution of the returns to each participant as a function of the risk-return points selected by the participants.

The present invention also provides a system for distributing returns from an investment portfolio lying on an efficient frontier among a plurality of participants comprising: (1) memory storage for storing (a) data representative of investment risk and expected returns associated with assets in a group of selected assets (b) and data representative of risk-return points on an efficient frontier selected by each of said participants; and (2) a processor for (a) determining said efficient frontier from said data representative of said investment risk and said expected returns associated with said assets, (b) determining a portfolio corresponding to a point on said efficient frontier, (c) determining returns from said portfolio, and (d) determining a distribution of said returns to each of said participants. The participants may comprise individuals, institutional investors, corporations, employers or any combination thereof. The principles of the present invention maybe applied to any financial product with an investment component, including mutual funds, variable annuities, variable universal life, 401(k) plans, etc.

Referring to FIG. 4, a system manager 10 maintains functional control of system 2. System manager 10 is preferably implemented as a main program module of a software program that comprises various subroutines or modules to perform the functions of the present invention as described herein. Various software structures may be implemented by persons of ordinary skill in the art to implement the methods of the present invention. The invention is not limited to the embodiments described herein.

System manager 10 receives data from an input list 15, and utilizes this data to determine an efficient frontier, as will be described below. Input list 15 comprises the data required to determine the efficient frontier. This would include estimated expected returns for each of a set of N assets and the data specifying risk characteristics of the set of N assets and combinations of those assets. Input list 15 may further comprise expected returns and data specifying the risk characteristics for asset classes as well as individual assets. For example, if standard deviation is used as the measure of risk, input list 15 would include the estimated variance or standard deviation of each asset and estimates of the covariances, $Cov(r_i, r_j)$, between each subset of two assets, $(a_i, a_j)$, that can be formed from the set of N assets used to construct the efficient frontier. If a risk measure other than standard deviation is used, there are other ways that the risk characteristics of the assets can be specified. For example, a multivariate probability distribution function for the returns of the assets and all combinations of the assets may be specified, with expected returns and risks derived from the specified distribution function. Alternatively, a desired risk measure may be expressed as a function of the standard deviations and covariances of the assets. Various measures of risk for determining an efficient frontier and the input information necessary to compute these measures of risk are known in the art. (See for example, "Post-Modern Portfolio Theory Comes of Age," B. Rom and K. Ferguson, *The Journal of Investing,* Fall 1994).

The assets selected for inclusion in an efficient portfolio 30 to be constructed according to the present invention will typically be selected by human input based upon asset analysis. The expected returns and covariances of input list 15 are derived primarily from historical data and analysis of the various assets selected to compute the efficient frontier. The data of input list 15 may be derived or transferred to system 2 from an external database or other data storage. Alternatively, these data may be input to system 2 by means of a terminal comprising a keyboard and video monitor. The data of input list 15 may be stored in any compatible memory location such as random access memory, magnetic tape or other memory configuration.

System manager 10 also receives participant data from a participant data file 25. Participant data file 25 comprises an expected rate of return, $\mu_i$, and a selected risk level, $\xi_i$, selected by each participant, i. In a preferred embodiment, the risk-return combination selected by each participant corresponds to one of a plurality of points on an efficient frontier. Efficient frontiers are determined by system 2, as described below. Participant data file 25 would comprise the point on the efficient frontier chosen by each investor, each point being represented by a different number or other distinct symbol. Each symbol would correspond to an expected return and risk level chosen by the investor, and the actual expected return and risk level corresponding to the selected point need not be stored directly in participant data file 25. Participant data file 25 further comprises the amount, $x_i$, invested by each participant, i. The amount $x_i$ includes the principal invested by the $i^{th}$ participant plus any prior earnings of the $i^{th}$ participant to be reinvested, less any withdrawals.

The data of input list 15 is input to an optimization routine 20. Optimization routine 20 functions to determine an efficient frontier based upon the data of input list 15, by determining the portfolio weights, $w_i$, that will yield the highest expected return for a combined portfolio of assets for a given level of risk. The portfolio weight, $w_i$, is the proportion of the value of the $i_{th}$ asset to the total value of all assets to be included in efficient portfolio 30. Equivalently, optimization routine 20 functions to determine the optimum portfolio weights, $w_i$, that yield the lowest level of risk for a combined portfolio for a given expected return. Optimization routine 20 may be implemented as a software subroutine that is called by system manager 10 whenever it is necessary or desirable to compute a new efficient frontier. Optimization routine 20 may be implemented using commercially available software that implements any suitable optimization algorithm. Alternatively, an optimization program could be developed by a person of ordinary skill in the art of optimization using, for example, linear or quadratic programming, to implement the functions of optimization routine 20.

Various measures of risk may be employed to determine an efficient frontier. For instance, if standard deviation is used as the measure of risk then optimization routine 20 would find the weights, $w_i$, for each asset that maximize $\bar{r}_T$ for each possible value of $\sigma_T^2$ in the following equations.

$$\bar{r}_T = \sum_{i=1}^{N} w_i \bar{r}_i$$

$$\sigma_T^2 = \sum_{i=1}^{N} w_i^2 \sigma_i^2 + \sum_{\substack{i=1 \\ i \neq j}}^{N} \sum_{j=1}^{N} w_i w_j \mathrm{cov}(r_i, r_j)$$

where:

| | |
|---|---|
| $\bar{r}_T$ | = the expected value of the rate of return of a combined portfolio consisting of $N$ assets; |
| $\bar{r}_i$ | = the expected value of the rate of return of the $i_{th}$ asset (from input list 15); |
| $\sigma_T$ | = the standard deviation of the rate of return of the combined portfolio; |
| $\sigma_i$ | = the standard deviation of the rate of return of the $i_{th}$ asset (from input list 15); and |
| $\mathrm{cov}(r_i r_j)$ | = the covariance of the rate of return of assets $a_i$ and $a_j$ (from input list 15). |

Alternatively, if another risk measure is used, for each value of that risk measure, weights, $w_i$, would be found to maximize $\bar{r}_T$ for each possible value of this chosen risk measure. a When semi-variance is used as the measure of risk, a single minimum acceptable return, $\bar{r}_{min}$, will be specified for efficient portfolio 30. Other measures of risk, such as value at risk, may also be employed to compute efficient frontiers to implement the present invention. It will be understood that the present invention may be implemented to offer participants a choice among a plurality of risk measures. In fact, it will be understood that the present invention may be used to determine multiple efficient frontiers, each corresponding to one of a plurality of risk measures selected by each participant. All participants choosing the same risk measure would be grouped together and would receive returns from an efficient portfolio corresponding to a point on an efficient frontier based on the common selected risk measure. In this embodiment, participant data file 25 would comprise each participant's selected choice of risk measure.

The output of optimization routine 20 is a set of risk-return points which define an efficient frontier. Associated with each risk-return point on the efficient frontier, is a unique set of weights, $w_i^e$, that yields a portfolio corresponding to that risk-return point. Each participant selects a point on the efficient frontier that corresponds most nearly to that participant's risk-return preference. Although, in one embodiment, an investor would be afforded the choice of any point on the efficient frontier, in a preferred embodiment, the investor is afforded a choice of one of a plurality of pre-selected points. Thus, for example, the investor may be offered a choice of one often points on the efficient frontier. The participant would then choose the point closest to his or her own risk-return preference. The expected return and risk level corresponding to the point chosen by each participant, or, alternatively, a symbol representing the chosen point, is input to participant data file 25. It will readily be understood that in the alternative to offering each participant a choice of points on the efficient frontier, each participant could be offered a choice of one of a plurality of investment objectives, such as conservative, moderate, aggressive, etc., which correspond to different risk-return opportunities. Each investment objective could correspond to a different point on an efficient frontier, with each such point corresponding to a mix of assets expected to produce the chosen investment objective.

System manager 10 selects an operating point on the efficient frontier. The operating point may be a predetermined point chosen independently of the efficient frontier points selected by the participants. In a preferred embodiment, however, an operating point is chosen that is associated with the risk-return points selected by the participants according to an operating point selection function. The operating point on the efficient frontier selected by system manager 10 may be selected to correspond to a level of risk associated with risk levels selected by each participant. In particular, the operating point may be selected to correspond to a risk level equal to a weighted average of risk levels selected by each participant. Alternatively, the operating point on the efficient frontier selected by system manager 10 may be selected to correspond to an expected return associated with expected returns selected by the participants. In particular, the operating point may be selected to correspond to an expected return equal to a weighted average of the expected returns selected by each participant. It will be understood that the present invention may be implemented to offer participants a choice among a plurality of operating point selection functions. In fact, it will be understood that the present invention may be used to construct multiple efficient portfolios, each portfolio corresponding to a point on an efficient frontier selected by one of a plurality of operating point selection functions chosen by each participant. All participants choosing the same operating point selection function would be grouped together and would receive returns from an efficient portfolio according to their common selected operating point function. In this embodiment, participant data file 25 would comprise each participants selected choice of operating point function.

Figure 1:
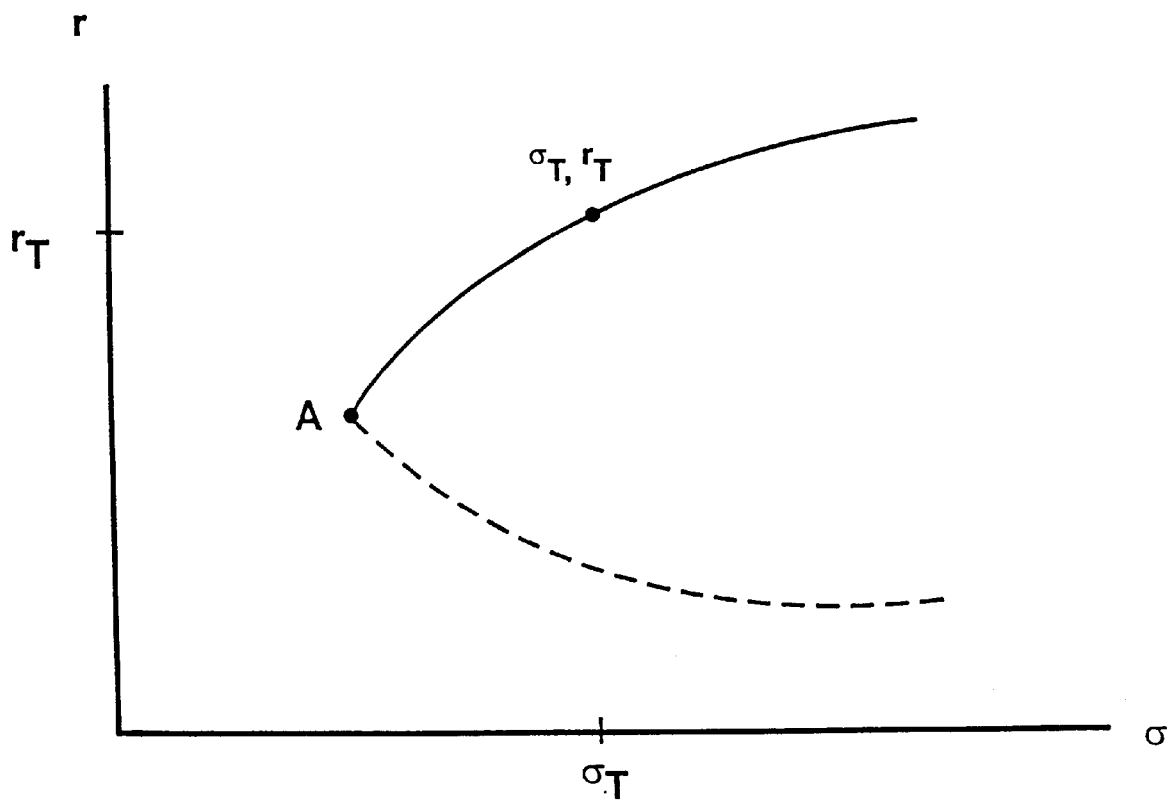
FIG. 1 is a graph of the minimum variance frontier of risky assets.
Figure 2:
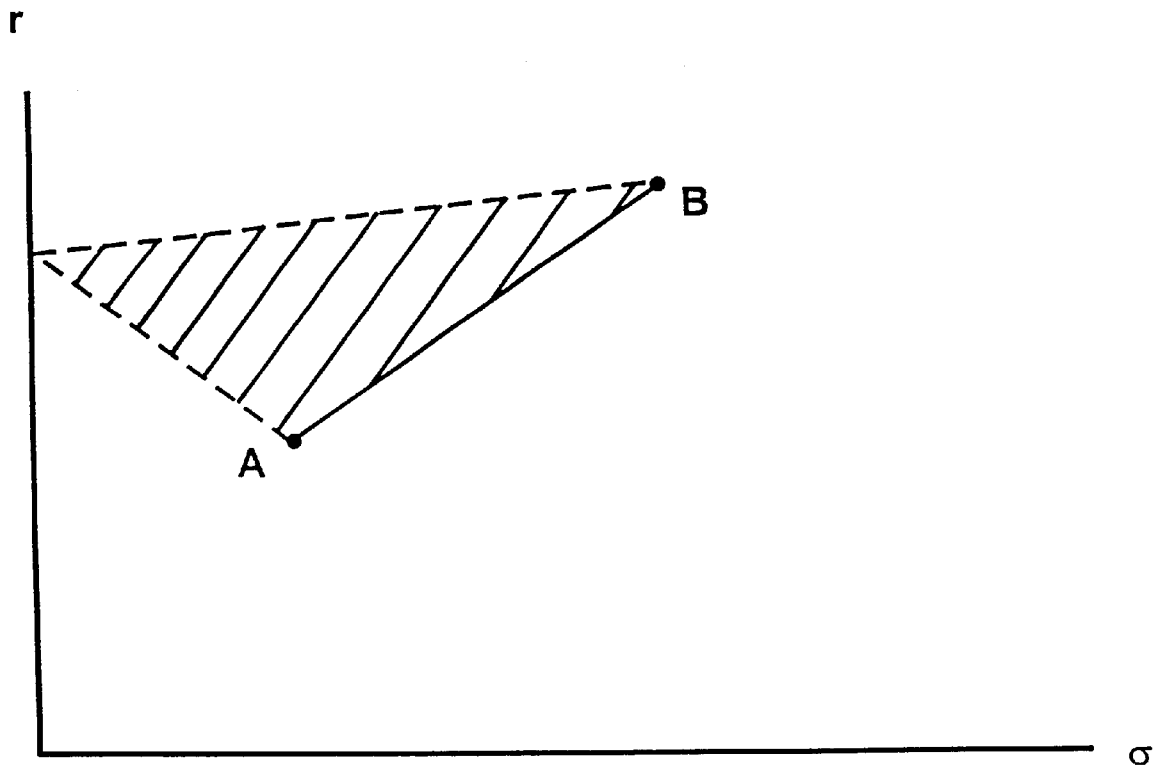
FIG. 2 is a graph of the boundaries of the efficient frontier between two assets.
Figure 3:
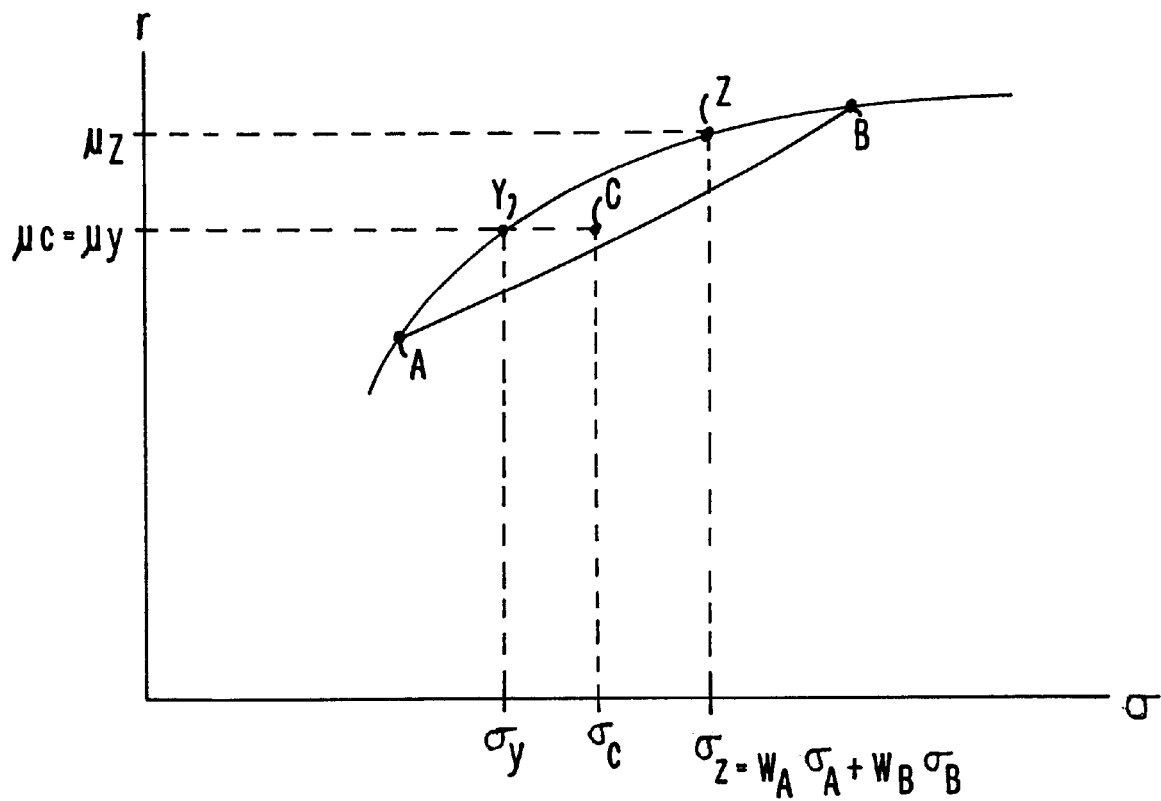
FIG. 3 is a plot of risk return points associated with portfolios on an efficient frontier.

Referring to FIG. 3, system manager 10 could construct a portfolio that lies on a point of the efficient frontier corresponding to an expected return equal to the weighted average of the expected returns selected by the participants. In this case, the standard deviation associated with a portfolio so constructed will be less than the weighted average standard deviation selected by the participants for the computed average expected return. For example, efficient portfolios A and B in FIG. 3 can be combined to form portfolio C. The expected return of portfolio C equals the weighted average $\omega$ expected return for portfolios A and B ($\mu_c = \omega_A \mu_A + \omega_B \mu_B$) and the standard deviation of portfolio C is less than the weighted average standard deviation of portfolios A and B, if the assets in A and B are not perfectly correlated. As seen in FIG. 3, system manager 10 can achieve a lower standard deviation with portfolio Y on the efficient frontier with the same expected return as portfolio C.

Alternatively, system manager 10 would construct a portfolio that lies on a point of the efficient frontier, that corresponds to the standard deviation equal to the weighted average of the standard deviations chosen by each participant. The expected return of the portfolio so constructed will be greater than the weighted average expected return chosen by the participants for the computed average standard deviation. In FIG. 3, Portfolio Z can be constructed on the efficient frontier such that the standard deviation of Portfolio Z equals the weighted average standard deviation of Portfolios A and B ($\mu_c = \omega_A \mu_A + \omega_B \mu_B$) The expected return of Portfolio Z would be greater than the weighted average expected return of Portfolios A and B. This could be thought of as starting at efficient portfolio Y (in FIG. 3), with standard deviation less than the weighted average standard deviation of combined Portfolios A and B, and moving up the efficient frontier to Portfolio Z, with standard deviation equal to the weighted average standard deviation of the combined portfolios.

In one embodiment, the operating point selection function is implemented by system manager 10 to compute a weighted average risk level, $\xi_T$, or a weighted average expected rate of return, $\mu_T$, based on participant data from participant data file 25. For example, system manager may compute $\xi_T$ as follows:

$$\xi_T = \sum_{i=1}^{P} \omega_i \xi_i$$

where:

$\xi_i$ = the risk level selected by the $i^{th}$ participant;

$\omega_i$ = the proportion of the $i^{th}$ participant's current balance, $x_i$, to the total current balance in the portfolio;

$$= x_i \bigg/ \sum_{i=1}^{P} x_i; \text{ where } \sum_{i=1}^{P} \omega_i = 1;$$

and

P is the number of participants.

Alternatively, a different operating point selection function may be implemented by system manager 10 to compute a weighted average rate of return, $\mu_T$, as follows:

$$\mu_T = \sum_{i=1}^{P} \omega_i \mu_i$$

where $\mu_i$ is the expected rate of return selected by the $i^{th}$ participant.

Figure 5:
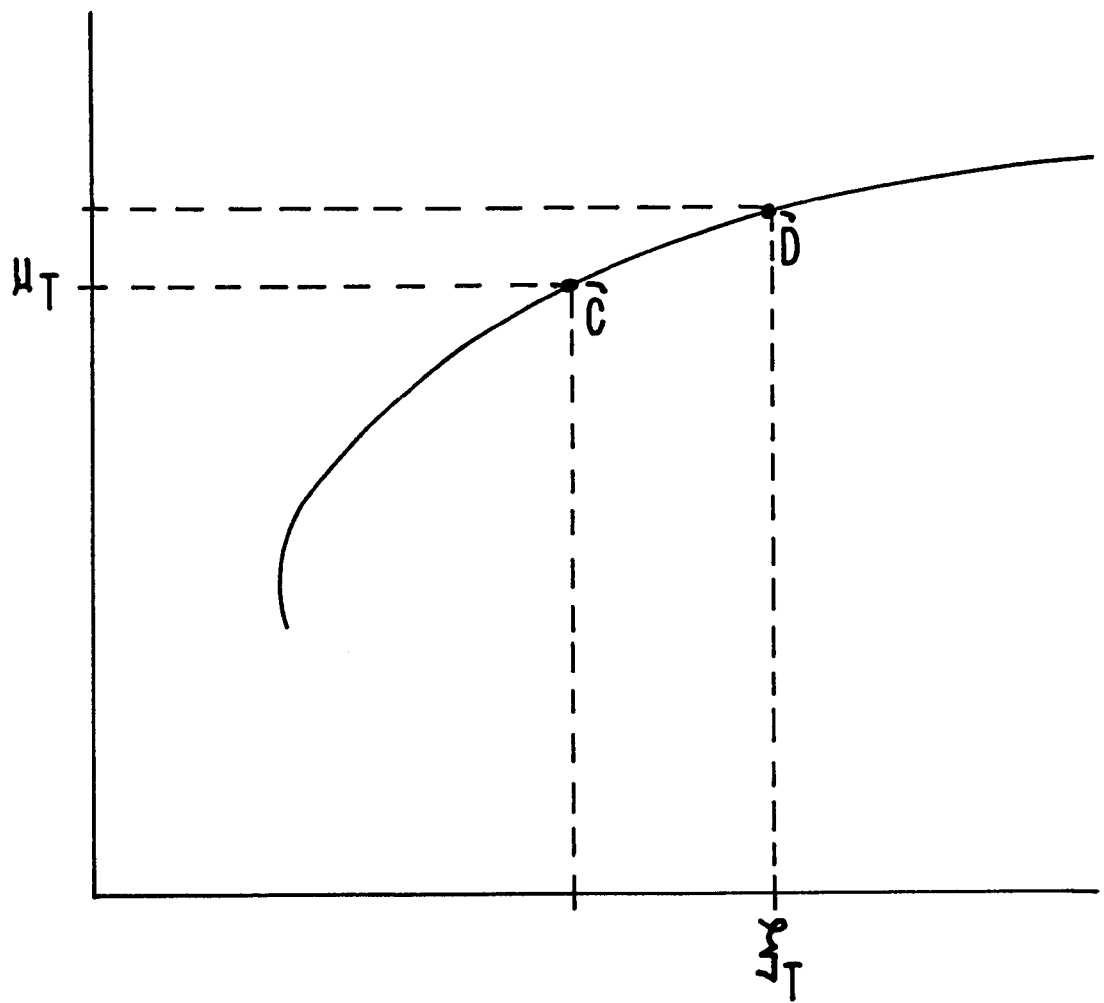
FIG. 5 is a plot of operating points on an efficient frontier.

Referring to FIG. 5, system manager 10 will then construct an efficient portfolio 30 that lies on the efficient frontier at an operating point, B, corresponding to the computed value of $\xi_T$, or at an operating point, C, corresponding to $\mu_T$. A portfolio corresponding to point B will be a portfolio that provides an expected return that is greater than the weighted average of the expected returns selected by the participants at a risk level that is equal to the weighted average of risk levels selected by the participants. A portfolio corresponding to point C will result in a portfolio that provides an expected return that is equal to the weighted average of expected returns selected by the participants at a risk level that is lower than the weighted average of risk levels selected by the participants. Other operating points could be chosen.

Efficient portfolio 30, corresponding to point B, may be constructed from the set of assets specified by input list 15 utilizing the weights, $w_n^e$, determined by optimization routine 20 corresponding to point B on the efficient frontier. Alternatively, efficient portfolio 30, corresponding to point C, may be constructed from the set of assets specified by input list 15 utilizing the set of weights, $w_n^e$, determined by optimization routine 20 corresponding to point C on the efficient frontier.

Once the operating point on the efficient frontier is selected, system manager 10 instructs buy/sell module 40 to execute trades to buy and sell assets as necessary to achieve a portfolio of assets corresponding to the assets of input list 15 in proportions determine by the weights, $w_n^e$, corresponding to the selected operating point on the efficient frontier.

Periodically (daily, monthly, etc.), system manager 10 will compute the actual return on efficient portfolio 30 based on current asset prices from current asset price date file 35:

$$r_T^e = \sum_{n=1}^{N} w_n^e r_n^e$$

where:

$r_T^e$ = the actual rate of return of efficient portfolio 30 for the most recent time interval;

$w_n^e$ = the proportion of the total portfolio invented in the $k$th assest; and $r_n^e$ = the actual rate of return of the $k$th asset in the portfolio for the most recent time interval.

Current asset prices from current asset data price file 35 may be obtained from one or more external data sources, and may be stored in a memory location accessible to system manager 10. The actual return, $R_T^e$ of efficient portfolio 30, is then distributed among the participants according to a prespecified allocation function by allocation module 50. It will be understood that actual and expected returns referred to herein for each asset and for efficient portfolio 30 are returns after deductions for expenses and costs have been made. It will further be understood that actual and expected returns may be positive or negative. That is, each asset and efficient portfolio 30 may produce a loss (negative return) or a gain (positive return). It will also be understood that the methods for allocating the returns from efficient portfolio 30, as disclosed herein, also apply to the allocation of returns from any single portfolio, even one that does not lie on an efficient frontier.

The present invention comprises a method of allocating returns from a single portfolio to a plurality of participants according to each participant's selected risk-return preference. A variety of allocation functions could be implemented by allocation module 50. In fact, it will be understood that the present invention may be used to construct multiple portfolios, each portfolio return being distributed to its participants according to a different pre-specified allocation function. Indeed, the present invention may be implemented to allow each participant to select his or her preferred allocation function. All participants choosing the same allocation function would be grouped together and would receive returns from an efficient portfolio according to their common selected allocation function. In this embodiment, participant data file 25 would comprise each participant's selected choice of allocation function.

Generally, the rate of return, $r_i$, allocated to each participant, may be expressed as some function of the expected rate of return and risk level chosen by each participant. That is, $r_i = f(\mu_1, \mu_2, \mu_3 \ldots \mu_P, \xi_1, \xi_2, \xi_3 \ldots \xi_P)$. One such allocation function is:

$$r_i = d\mu_i + c \xi_i$$

where ($\mu_i$, $\xi_i$) are the expected percentage return and risk level chosen by the $i^{th}$ participant. The actual dollar amount of return, $R_i$, received by each participant is:

$$R_i + db_i\mu_i + cb_i \xi_i$$

where $b_i$ is $i^{th}$ participant's current balance in the portfolio at the beginning of the allocation period. The symbols d and c represent quantities that will depend upon the specific pre-defined allocation method selected for distribution of the actual return from portfolio 30. The returns, $R_i$, are allocated to each participant periodically (e.g., monthly, annually, etc.). The quantities, $\mu_i$ and $\xi_i$ will depend on the allocation frequency. For example, if returns are allocated monthly, then $\mu_i$ and $\xi_i$ will be monthly values. The quantities, c & d, are recalculated each time returns are allocated. $R_i$ can be positive or negative.

The total distribution to all participants will be equal to the actual return, $R_T^e$, of portfolio 30:

$$R_T^e = \sum_{i=1}^{P} R_i = d\sum_{i=1}^{P} b_i\mu_i + c\sum_{i=1}^{P} b_i\xi_i$$

By appropriate selection of c and d, a desired allocation of the total return can be obtained.

Consider for example an efficient portfolio at operating point B in FIG. 5, where the expected return is greater than the weighted average of expected returns selected by the participants and the risk level of the portfolio is equal to the weighted average of risk levels chosen by the participants. Choosing d=1 results in:

$$c = \frac{R_T^e - \sum b_i\mu_i}{\sum b_i\xi_i}$$

Since the expected return amount of efficient portfolio 30 is greater than $\Sigma b_i\mu_i$, the expected value of c, $\bar{c}$, is greater than zero. Notice, however, that the variance of c is equal to 1:

$$\text{Var}(c) = \frac{\text{Var}(R_T)}{(\sum b_i\xi_i)^2} = \frac{(\sum b_i\xi_i)^2}{(\sum b_i\xi_i)^2} = 1$$

Figure 6:
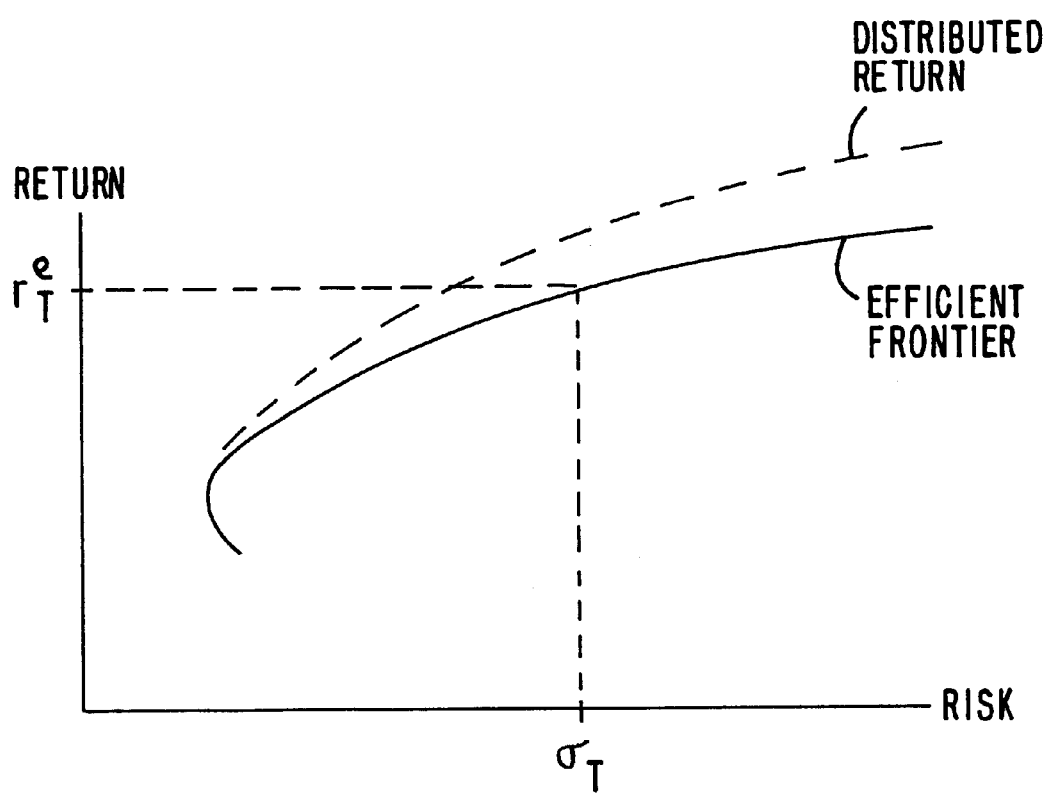
FIG. 6 is a graph of the distribution of the return from an efficient portfolio based on each participant's selected risk level.

Each participant receives a rate of return in a given allocation period of $r_i = \mu_i + c\cdot\xi_i$ and an amount $b_ir_i$. The expected value of $r_i$, $E(r_i)$ is equal to $\mu_i + \bar{c}\xi_i$, which is greater than $\mu_i$, since $\bar{c} > 0$. Further, since Var(c)=1, the standard deviation of $r_i = \xi_i$. Therefore, each participant receives a return that has the same risk level as chosen by the participant but an expected return that is higher than the expected return chosen by the participant. This distribution is illustrated in FIG. 6. According to this allocation method each participant can expect to receive a rate of return that is a function of his or her selected level of risk. If an investor selects a high level of risk, he or she will receive a greater share of the deviation of the actual return from the expected return, positive or negative. For example, if the actual return of portfolio 30 falls below the average expected return of participants, then participants who chose a higher level of risk would incur a greater amount of the deficiency than participants who chose a lower risk level. Conversely, if the actual return of portfolio 30 is above the expected return then participants who chose a higher risk level would receive a greater amount of the excess than participants who chose a lower risk level. Consider now, an efficient portfolio at operating point C in FIG. 5. Then, $\bar{c}=0$ and Var(c)<1. In this case, each participant receives a return that has the same expected value as selected by the participant but with a lower risk level.

An alternative allocation is attained by choosing d= $\bar{R}_T^e/\Sigma b_i\mu_i$, where $\bar{R}_T^e$ is the expected value of the return of the efficient portfolio, so that:

$$R_T^e = \bar{R}_T^e + c\sum b_i\xi_i \quad \text{and} \quad c = \frac{R_T^e - \bar{R}_T^e}{\sum b_i\xi_i}$$

Figure 7:
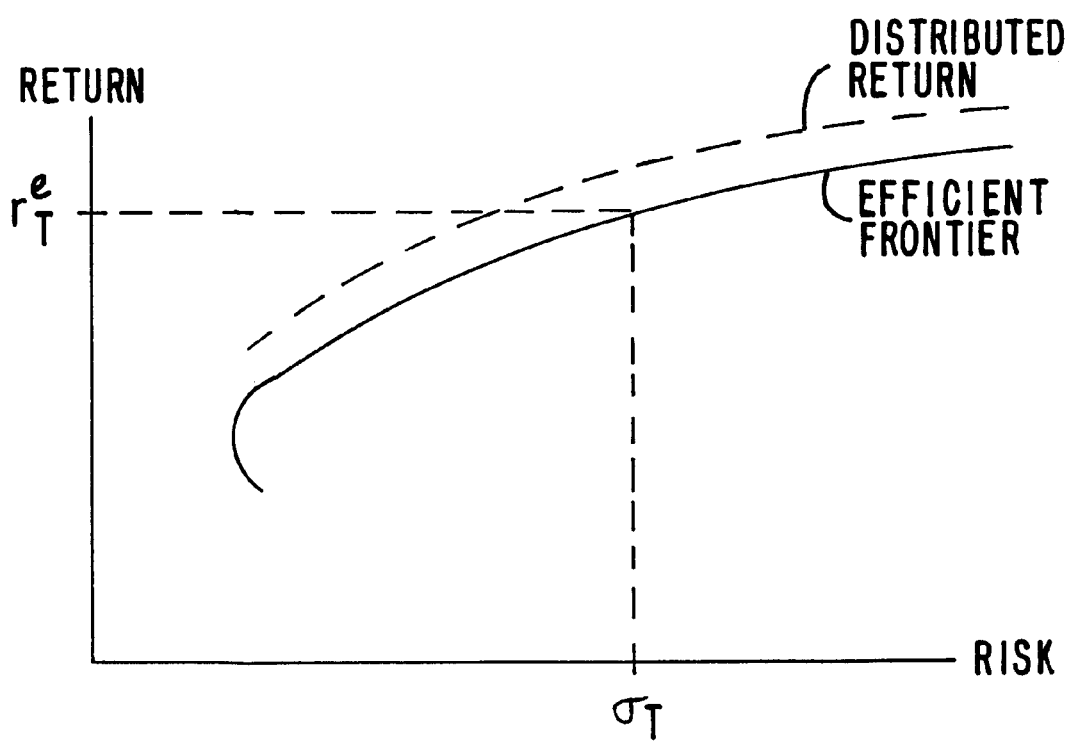
FIG. 7 is a graph of the distribution of the return from an efficient portfolio based on each participant's selected expected return.

Then, $\bar{c}=0$ with variance equal to 1. Each participant will receive a rate of return, $r_i = d\mu_i + c\xi_i$. The expected rate of return per participant is therefore $d\mu_i > \mu_i$ with standard deviation $\xi_i$. According to this allocation method, each participant's expected rate of return is a function of the ratio of the expected return of portfolio 30 to the weighted average of returns selected by the participants. This is illustrated in FIG. 7. Other allocation methods can be implemented by allocation module 50. The rates of return for each participant, $r_i$, and the dollar amount of the return for each participant, $R_i$, will be recorded in a system memory and allocated to the participants. The participant return, may then be transferred electronically to a memory location corresponding to an account of the participant. The amount of the participant's return, $R_i$, will be algebraically added to the participant's investment amount and any withdrawals will be subtracted from the participant's investment amount.

As the assets in efficient portfolio 30 change in value over time, the proportion of the value of each asset to the total value of all assets will change. Therefore, the actual weights of each asset will deviate from the optimal values, $w_n^e$, determined by optimization module 20 corresponding to the selected operating point on the efficient frontier. Therefore, it is desirable to periodically buy and sell portions of assets comprising efficient portfolio 30 as necessary to maintain the weight of each asset as close as possible to the optimal weights. Assets comprising efficient portfolio 30 may be brought and sold as needed by buy/sell module 40 as directed by system manager 10. This may be accomplished by electronic funds transfer methods well known in the art.

Periodically, the operating point of the efficient frontier must be redetermined. This will occur whenever a new participant is admitted, deposits or withdrawals are made, or a participant changes his or her point on the efficient frontier. Periodically, efficient portfolio 30 must be redetermined to reflect changes in the assets comprising the portfolio and changes in the expected risks, returns, and correlations of the assets comprising the portfolio.

When different assets are to be included in efficient portfolio 30 it is necessary for optimization routine 20 to redetermine the efficient frontier based on a new input list 15. The present invention may be implemented to provide guarantees with respect to the returns allocated to each participant. For example, a minimum rate of return each investment period or over a series of investment periods can be provided. The guarantee can also be tied to the rate of return of other assets or an index such as the S&P 500. Further, these guarantees can vary according to risk levels selected by the participants. Guarantees can be optional for each participant. When guarantees are provided the risk that the actual return for each participant falls below the guaranteed level is absorbed by the provider of the efficient portfolio.

While this invention has been described with reference to the foregoing preferred embodiments, the scope of the present invention is not limited by the foregoing written description. Rather, the scope of the present invention is defined by the following claims and equivalents thereof.

I claim:

1. A computer-implemented method for distributing returns from an investment portfolio to a plurality of participants, comprising the steps of:

forming a portfolio of assets corresponding to an operating point on an efficient frontier determined in accordance with risk-return preferences specified by the participants having varying risk-return preferences;

distributing returns from the portfolio among the participants according to an allocation function of said risk-return preferences specified by the participants.

2. The method of claim 1, wherein the operating point on the efficient frontier is a function of risk-return points selected by the participants.

3. The method of claim 1, wherein the operating point on the efficient frontier corresponds to a level of risk equal to a weighted average of risk levels selected by each participant.

4. The method of claim 1, wherein the operating point on the efficient frontier corresponds to an expected return equal to a weighted average of expected returns selected by each participant.

5. A system for distributing returns from an investment portfolio among a plurality of participants comprising:

memory storage for:
storing data representative of risk-return preferences specified by each of the participants; and a processor for:
determining a portfolio of assets corresponding to an operating point on an efficient frontier in accordance with the risk-return preferences specified by the participants having varying risk-return preferences;

determining the distribution of the returns from the portfolio to each of the participants according to an allocation function of the risk-return preferences; and distributing the returns from the portfolio among the participants.

6. The system of claim 5, wherein the operating point on the efficient frontier is a function of risk-return preferences specified by the participants.

7. The system of claim 5, wherein the operating point on the efficient frontier corresponds to a level of risk equal to a weighted average of the risk-levels selected by each participant.

8. The system of claim 5, wherein the operating point on the efficient frontier corresponds to an expected return equal to a weighted average of expected returns selected by each participant.

9. The system of claim 5, wherein said returns are distributed as a function of risk return points chosen by the participants.

10. The method of claim 1, wherein the step of distributing the returns is performed by electronic funds transfer.

11. The method of claim 1, wherein the allocation function provides each participant a return that deviates from the participant's expected return in proportion to a ratio of an expected return of the portfolio to a weighted average of expected rates of return selected by the participants.

12. The method of claim 1, wherein the allocation function provides each participant a return that deviates from the participant's expected return in proportion to the extent that the return of the portfolio deviates from a weighted average of expected rates of return selected by the participants.

13. The method of claim 1, wherein the allocation function provides each participant a return that deviates from the participant's expected return in proportion to the extent that the return of the portfolio deviates from the expected return of the portfolio.

14. The method of claim 1, wherein the allocation function provides each participant a return that deviates from the participant's chosen expected return by an amount proportional to the risk level chosen by the participant.

15. The method of claim 1, wherein the allocation function provides each participant a return that deviates from the participant's chosen expected return by an amount proportional to the expected rate of return chosen by the participant.

16. A method for distributing returns from an investment portfolio to a plurality of participants, comprising the steps of:

forming a portfolio of assets corresponding to an operating point on an efficient frontier; and distributing returns from the portfolio among the participants according to an allocation function of risk-return preferences chosen by the participants;

wherein the allocation function provides each participant an expected rate of return, $r_i = d\mu_i + c\xi_i$, where $\mu_i$ is the expected rate of return chosen by the $i^{th}$ participant and $\xi_i$ is the risk level chosen by the $i^{th}$ participant, and:

$$d = 1, \quad c = \frac{R_T^e - \sum b_i \mu_i}{\sum b_i \xi_i},$$

$R_T^e$ is the actual return of the portfolio, and $b_i$ is the $i^{th}$ participant's balance in the portfolio; and the actual return, $R_i$, allocated to each participant is given by:

$$R_i = db_i\mu_i + cb_i\xi_i.$$

17. A method for distributing returns from an investment portfolio to a plurality of participants, comprising the steps of:

forming a portfolio of assets corresponding to an operating point on an efficient frontier; and distributing returns from the portfolio among the participants according to an allocation function of risk-return preferences chosen by the participants;

wherein the allocation function provides each participant an expected rate of return, $r_i = d\mu_i + c\xi_i$, where $\mu_i$ is the expected rate of return chosen by the $i^{th}$ participant and $\xi_i$ is the risk level chosen by the $i^{th}$ participant, and:

$$d = \frac{\overline{R}_T^e}{\sum b_i \mu_i}$$

$$c = \frac{R_T^e - \overline{R}_T^e}{\sum b_i \xi_i},$$

$R_T^e$ is the actual return of the portfolio, $\overline{R}_T^e$ is the expected return of the portfolio and $b_i$ is the $i^{th}$ participant's balance in the portfolio; and the actual return, $R_i$, allocated to each participant is given by:

$$R_i = db_i\mu_i + cb_i\xi_i.$$

18. The method of claim 1, wherein each different risk-return preference corresponds to a different point on the efficient frontier.

19. The system of claim 5, wherein the allocation function provides each participant a return that deviates from the participant's expected return in proportion to a ratio of an expected return of the portfolio to a weighted average of expected rates of return selected by the participants.

20. The system of claim 5, wherein the allocation function provides each participant a return that deviates from the participant's expected return in proportion to the extent that the return of the portfolio deviates from a weighted average of expected rates of return selected by the participants.

21. The system of claim 5, wherein the allocation function provides each participant a return that deviates from the participant's expected return in proportion to the extent that the return of the portfolio deviates from the expected return of the portfolio.

22. The system of claim 5, wherein the allocation function provides each participant a return that deviates from the participant's chosen expected return by an amount proportional to the risk level chosen by the participant.

23. The system of claim 5, wherein the allocation function provides each participant a return that deviates from the participant's chosen expected return by an amount proportional to the expected rate of return chosen by the participant.

24. A system for distributing returns from an investment portfolio among a plurality of participants comprising:

memory storage for:
    storing data representative of risk-return points selected by each of the participants; and
  a processor for:
    determining a portfolio of assets corresponding to an operating point on an efficient frontier;
    determining the distribution of the returns from the portfolio to each of the participants according to an allocation function of the risk-return points; and
    distributing the returns from the portfolio among the participants
  wherein the allocation function provides each participant an expected rate of return, $r_i = d\mu_i + c\xi_i$, where $\mu_i$ is the expected rate of return chosen by the $i^{th}$ participant and $\mu_i$ is the risk level chosen by the $i^{th}$ participant, and:

$$d = 1, \quad c = \frac{R_T^e - \sum b_i \mu_i}{\sum b_i \xi_i},$$

$R_T^e$ is the actual return of the portfolio, and $b_i$ is the $i^{th}$ participant's balance in the portfolio; and
the actual return, $R_i$, allocated to each participant is given by:

$$R_i = db_i \mu_i + cb_i \xi_i.$$

25. A system for distributing returns from an investment portfolio among a plurality of participants comprising:

memory storage for:
  storing data representative of risk-return points selected by each of the participants; and
  a processor for:
  determining a portfolio of assets corresponding to an operating point on an efficient frontier;
  determining the distribution of the returns from the portfolio to each of the participants according to an allocation function of the risk-return points; and
  distributing the returns from the portfolio among the participants
  wherein the allocation function provides each participant an expected rate of return, $r_i = d\mu_i + c\xi_i$, where $\mu_i$ is the expected rate of return chosen by the $i^{th}$ participant and $\xi_i$ is the risk level chosen by the $i^{th}$ participant, and:

$$d = \frac{\overline{R}_T^e}{\sum b_i \mu_i}$$

$$c = \frac{R_T^e - \overline{R}_T^e}{\sum b_i \xi_i},$$

$R_T^e$ is the actual return of the portfolio, $\overline{R}_T^e$ is the expected return of the portfolio and $b_i$ is the $i^{th}$ participant's balance in the portfolio; and
the actual return, $R_i$, allocated to each participant is given by:

$$R_i = db_i \mu_i + cb_i \xi_i.$$

26. The system of claim 5, wherein the distribution determined by the processor is stored to be available for subsequent use.

27. The system of claim 5, wherein each different risk-return preference corresponds to a different point on the efficient frontier.

28. A computer implemented method for distributing returns from each one of a plurality of investment portfolios to a respective one of a plurality of groups of participants, comprising the steps of:

forming for each group of participants a portfolio of assets corresponding to an operating point on an efficient frontier determined in accordance with risk-return preferences specified by each participant having varying risk-return preferences in the group;
  distributing for each portfolio the returns from the portfolio among the participants in the group for which the portfolio was formed according to an allocation function of the risk-return preferences specified by each participant in the group.

29. The method of claim 28, wherein the operating point for each portfolio is a function of the risk-return points of the participants in the group for which the portfolio is formed.

30. The method of claim 28, wherein each group may select one of a plurality of different operating point selection functions for determining the operating point for the portfolio of the group.

31. The method of claim 28, wherein each group may select one of a plurality of efficient frontiers for which to form a portfolio of assets for the group.

32. The method of claim 28, wherein each group may select one of a plurality of allocation functions for distributing the returns of the portfolio of the group.

33. A computer implementated method for determining a distribution of returns from an efficient portfolio to a plurality of participants comprising the steps of:

specifying a risk-return preference by each participant;
  selecting an allocation function in accordance with the risk-return preferences specified by each participant having varying risk-return preferences;
  computing and allocating a return for each participant in accordance with the allocation function.

34. The method of claim 33, wherein the amount of the return for each investor is stored to be available for subsequent use.

35. A computer-implemented method for determining a distribution of returns from an efficient portfolio to a plurality of participants, comprising the steps of:

determining a risk level and expected rate of return for each participant; and computing for each participant an expected rate of return, $r_i = d\mu_i + c\xi_i$, where $\mu_i$ is the expected rate of return chosen by the $i^{th}$ participant and $\xi_i$ is the risk level chosen by the $i^{th}$ participant, d and c are chosen to satisfy the following equation:

$$R_T^e = \sum_i db_i\mu_i + cb_i\xi_i,$$

where $R_T^e$ is the actual return of the portfolio, and $b_i$ is the $i^{th}$ participant's balance in the portfolio; and allocating the returns to each participant, wherein the actual return, $R_i$, allocated to each participant is given by:

$$R_i = db_i\mu_i + cb_i\xi_i.$$

36. The method of claim 35, wherein:

$$d = 1, \quad c = \frac{R_T^e - \sum b_i\mu_i}{\sum b_i\xi},$$

$R_T^e$ is the actual return of the portfolio, and $b_i$ is the $i^{th}$ participant's balance in the portfolio.

37. The method of claim 35, wherein:

$$d = \frac{\overline{R_T^e}}{\sum b_i\mu_i}$$

$$c = \frac{R_T^e - \overline{R_T^e}}{\sum b_i\xi},$$

$R_T^e$ is the actual return of the portfolio, $\overline{R_T^e}$ is the expected return of the portfolio and $b_i$ is the $i^{th}$ participant's balance in the portfolio.

* * * * *